(12) United States Patent  (10) Patent No.: US 7,694,515 B2
Miller  (45) Date of Patent: Apr. 13, 2010

(54) ENGINE (76) Inventor: Michael Miller, 1510 Winchester Rd., Annapolis, MD (US) 21409

( * ) Notice: Subject to any disclaimer, the term of this patent is extended or adjusted under 35 U.S.C. 154(b) by 258 days.

(21) Appl. No.: 11/676,416

(22) Filed: Feb. 19, 2007

(65) Prior Publication Data

US 2008/0196412 A1   Aug. 21, 2008

(51) Int. Cl.
F03C 1/00 (2006.01)
F01K 7/00 (2006.01)
(52) U.S. Cl. .............................. 60/531; 60/670; 60/675
(58) Field of Classification Search .................. 60/645, 60/670, 530, 531, 675
See application file for complete search history.

(56) References Cited

U.S. PATENT DOCUMENTS

| 243,909 | A | | 7/1881 | Iske | |
|---|---|---|---|---|---|
| 3,358,451 | A | | 12/1967 | Feldman et al. | |
| 3,441,482 | A | * | 4/1969 | Avery | 202/175 |
| 3,546,473 | A | | 12/1970 | Rich | |
| 3,636,706 | A | | 1/1972 | Minto | |
| 3,659,416 | A | * | 5/1972 | Brown | 60/530 |
| 3,901,033 | A | | 8/1975 | McAlister | |
| 3,975,097 | A | | 8/1976 | Minto | |
| 4,051,678 | A | * | 10/1977 | Yates | 60/641.6 |
| 4,131,171 | A | | 12/1978 | Keyes | |
| 4,291,755 | A | | 9/1981 | Minto | |
| 4,403,643 | A | | 9/1983 | Minto | |
| 4,637,211 | A | | 1/1987 | White et al. | |
| 5,228,293 | A | | 7/1993 | Vitale | |
| 6,978,610 | B2 | | 12/2005 | Carnahan | |

FOREIGN PATENT DOCUMENTS

GB  1251484  10/1971
GB  1301214  12/1972

OTHER PUBLICATIONS

International Search Report in corresponding PCT application PCT/US08/54243.
Wallace Minto: Freon Power Wheel from www.rexresearch.com (37 pages).
Minto Wheel from the Mother Earth News, Issue 40, Jul. 1976.
Wally Minto's Wonder Wheel, Popular Science, Mar. 1976.

* cited by examiner

*Primary Examiner*—Hoang M Nguyen
(74) *Attorney, Agent, or Firm*—George Willinghan; August Law, LLC (57) ABSTRACT

An engine is provided that utilizes an active heat exchanger such as a heat pump to transfer heat into and remove heat from a low boiling point liquid that is disposed in a pair of diametrically opposed containers. The addition of heat into the low-boiling point liquid causes the liquid to move vertically from a bottom container to a top container, transforming the transferred heat energy into potential energy. The top container is allowed to fall under the weight of the transferred liquid, transforming the potential energy to kinetic energy which is used to perform the desired work. The expanding low-boiling point liquid can also be used to advance a magnetic back and forth through a wire coiling to produce an electric current, converting the transferred heat energy into electrical energy. The use of an active heat exchanger such as a heat pump permits the use of one unit of electrical energy to transfer 3 to 5 units of heat energy.

25 Claims, 5 Drawing Sheets

ENGINE

FIELD OF THE INVENTION

The present invention is directed to improvements in the construction and operation of low temperature gradient engines.

BACKGROUND OF THE INVENTION

A slow moving, high torque engine or generator is known that operates on a very small temperature differential. This engine is commonly referred to as a Minto Wheel after its inventor Wallace Minto. The engine is arranged as a wheel that contains a series of sealed containers. The sealed containers are placed around the rim of the wheel and are aligned as diametrically opposed pairs. Each diametrically opposed pair is in fluid connection through a tube. The wheel rotates in a vertical plane. In any given pair at any given moment in time during the rotation, one of the containers is moving in a generally upward direction, and the other container is moving in a generally downward direction. At one position in the rotation, the containers are aligned vertically, with one container at the top being in the uppermost position and one container at the bottom being in the lowermost position. Each container moves between the uppermost and lowermost positions.

Each opposed pair of containers and the associated connecting tube form a sealed unit. Into each sealed unit a volume of a low-boiling liquid, for example propane, butane, carbon dioxide or Freon is introduced. For a given pair located at or near the vertically aligned position, most of the introduced volume of liquid is disposed in the lowermost container. The lowermost container is then exposed to a very mild increase in temperature, for example an increase of as little as 2° centigrade or about 3.5° F. Since such small temperature differences are abundant in nature, for example the temperature difference between water and cooler air or the difference between direct sunshine and shade, the heat necessary for imparting the mild increase in temperature is derived from a passive source. This passive source is a water bath containing hot, solar heated water through which the containers pass as the wheel rotates.

The small temperature increase in the liquid in the lowermost container vaporizes a portion of the liquid, producing a higher pressure on the surface of the liquid. This pressure forces the liquid up the connecting tube and into the uppermost container. This transfer of liquid from the lowermost container to the uppermost container transfers mass to the uppermost container, causing the container to increase in weight while the lowermost container decreases on weight. Gravity pulls the uppermost container downward, turning the wheel in a manner similar to the turning of a water wheel. As the previously uppermost container approaches the bottom, i.e. approaches the lowermost position, the container is exposed to the heat source. In this case, the container passes through the hot water bath. Upon exposure to the heat source, the liquid in the now lowermost container is again forced through the connecting tube to the other container, which is now the uppermost container having cooled as it traveled upward. This cycle of liquid transfer between opposed containers is repeated continuously to produce constant rotational motion in the wheel. This rotational motion can be used for any desired mechanical work. Wheels of modest size can perform such tasks as pumping water for irrigation, grinding food grains and generating small amounts of machine power. The wheel turns relatively slowly, but produces enormous torque. This high torque rotational motion can be geared up to produce any speed desired at the final output shaft. Although output can be converted to higher speeds, the wheel or engine is most effective for applications that utilize high torque at low speed.

The horsepower produced by the rotating wheel is proportional to the product of torque and speed, i.e. revolutions per minute of the wheel. For a given wheel exposed to a given temperature difference between opposed containers, a particular maximum horsepower is produced when fully loaded. This maximum horsepower, i.e. the power output, of the wheel is proportional to the rate at which heat is transferred into the liquid in the lowermost container and out of the vapor phase in the uppermost container. The greater the rate of heat transfer and the greater the temperature difference between the lowermost container and the uppermost container, the greater the power output and efficiency of conversion of heat to power. For the passively heated wheels and containers created from small tanks or lengths of cylindrical pipe, the temperature gradient and ability to transfer heat into and out of the containers is limited, limiting the power output of the engine.

In addition to the heat transfer rate limitations, conventional arrangements of the wheel fix each container into a given position along the wheel. Therefore, each container is heated in series and can only be heated once it approaches the bottom of the wheel. Also, by fixing all of the containers together in series in a single wheel, each container in the wheel must rotate at the same given rate.

Therefore, arrangements of an engine or generator that utilize the low-boiling liquid and that produce greater power output by providing for an increase in temperature differential and an increased rate of heat transfer are desired. These arrangements would provide for the simultaneous heating and cooling of opposed containers. In addition, multiple containers could be heated in parallel, and each pair of containers could rotate at speeds independent of the other pairs up to the free fall speed of a given container.

SUMMARY OF THE INVENTION

Systems in accordance with exemplary embodiments of the present invention utilize active heat transfer devices such as heat pumps to transfer heat between the ambient atmosphere and a low boiling point liquid disposed in containers that are arranged as rotating pairs as in, for example, a Minto Wheel arrangement. Each pair of containers has at least one and potentially two integrated heat pumps. A heat pump is used to transfer energy, i.e. heat, into the lowermost container. At the same time, a heat pump is used to remove heat from the uppermost container. As the containers rotate, energy is recaptured. Depending upon the size of the unit and its efficiency, the recaptured energy would represent an energy savings.

In one embodiment, a plurality of container pairs are arranged along a common rotatable shaft. In one arrangement, all of the container pairs are fixed to the shaft and aligned at the same angle with respect to the circumference of the shaft. Alternatively, the containers are fixed to the shaft and aligned at different locations or angles around the circumference of the shaft so that at any given moment only a single container from one of the container pairs is located at a top or uppermost position. In one embodiment, the containers are not fixedly secured to the shaft but can rotate with respect to the shaft in at least one direction of rotation. For example, each pair of containers is arranged so that one of the containers is disposed on either end of an arm. This arm is attached to the shaft, preferably at a midpoint between the two containers. The attachment between the arm and the shaft is arranged so that the arm moves about the shaft freely during a portion of the rotation, i.e. the arm does not impart rotational motion to the shaft during a portion of the rotation about the shaft. Therefore, the uppermost container is allowed to free fall from the uppermost position to a point where the arm engages the shaft. As the container fails, the arm engages the drive shaft, accelerating the drive shaft. In one embodiment, the connection between the arm and shaft is arranged so that the shaft can rotate without imparting rotational motion to the arm. Therefore, when multiple arms are disposed along the shaft, the rotation of one arm about the shaft will not affect the rotation of other arms.

In one embodiment, the system includes a transmission or gearbox attached to the shaft to modify the rotational speed or torque that is outputted by the shaft. Suitable transmissions and gearboxes are known and available in the art. In one embodiment, a flywheel is provided in communication with the shaft. In one embodiment, a transmission is used to increase the speed of the flywheel.

The amount of work outputted by the rotating shaft, and hence the amount of energy recaptured by an electric generator or imparted to a mechanical device in communication with the rotating shaft, is directly proportional to the number of containers that are filled with working fluid, disposed in the uppermost position and ready to fall and to engage the drive shaft at any given time interval. In one embodiment, for example an embodiment suitable for industrial applications, the system is arranged to generate electricity. Other arrangements can be made to create hydraulic pressure. In addition, the system can be arranged as a portable or mobile system having containers that are each less than or equal to 20 inches wide and shaped such that their natural rotation would carry the uppermost container pass the 180° mark, such that when it became charged it would fall forwards by the pulling of gravity.

In accordance with one embodiment, the present invention is directed to an engine that includes two containers arranged as a diametrically opposed pair and at least one connecting tube in communication with each container such that the diametrically opposed pair is in fluid communication through the attached connecting tube. A volume of a low boiling point liquid is disposed in the diametrically opposed pair of containers and is capable of moving between the containers through the connecting tube. Suitable low boiling point liquids include chlorofluorocarbons, hydrofluorocarbons, liquid ammonia, propane, carbon dioxide or butane. In order to provide the heat transfer necessary to move the low boiling point liquid between containers, the engine includes at least one active heat exchanger in communication with each container. The active heat exchanger is capable of transferring heat to and removing heat from the containers. Preferably, the active heat exchanger is a heat pump.

In one embodiment, the engine includes two active heat exchangers arranged such that one of the active heat exchanger is in communication with each container. The active heat exchanger includes a controller portion and a heat exchanger portion in communication with the controller portion. The controller portion includes at least one compressor, at least one valve and control electronics. The controller portion is capable of directing the active heat exchanger to either transfer heat to or to extract heat from each one of the containers. The heat exchanger portion can have two portions arranged such that one heat exchanger portion is disposed in each one of the containers. In addition to the portions disposed in the container, at least one additional heat exchanger portion is provided to exchange heat with the ambient environment.

In addition to having just two containers, the engine can include a plurality of containers arranged as a plurality of diametrically opposed pairs. A plurality of connecting tubes attached to the containers is provided such that each diametrically opposed pair is in fluid communication through at least one of the connecting tubes. The low boiling point liquid is disposed in each one of the diametrically opposed pairs. The engine includes the active heat exchangers, and in one embodiment, a plurality of active heat exchangers, e.g., a plurality of heat pumps, is provided such that at least one active heat exchanger is in communication with each one of the diametrically opposed pairs of containers. In one embodiment, the engine includes a rotatable shaft of a given length that is in communication with pairs of containers such that the containers can impart rotational motion to the shaft. Each pair of containers rotates about the shaft in a plane that is substantially perpendicular to the shaft. Preferably, each pair of containers rotates about the shaft independent of the other pairs, and the planes in which the pairs rotate are generally parallel and spaced along a length of the shaft. In one embodiment, the engine also includes an arm attached to both containers in a given pair of containers such that each container in the pair is disposed on either end of the arm. The rotatable shaft is in contact with the arm at a point along the arm between the two containers, and the arm is shaped to engage the shaft to impart rotational motion from the arm to the shaft during at least a portion of each rotation of the arm around the shaft. Flywheels can be placed in communication with the shaft to store rotational energy, and transmissions can be placed in communication with the shaft to modify the speed or torque of the shaft.

In one embodiment, each arm is shaped to engage the shaft during only a portion of the rotation of the aim about the shaft. For example, the planes in which each pair of containers rotates are substantially vertical, and the containers in each pair oscillate between an uppermost position and a lowermost position. When moving from the uppermost position to the lower most position, each container is capable of free falling at least a portion of the distance between the uppermost position and the lowermost position. The engine can include a control mechanism to control the rotation of the pairs of containers about the shaft and hence the initiation of free fall of any given container. Therefore, the control mechanism times when a given container can begin a free fall from its uppermost position to its lowermost position.

In one embodiment, the present invention is directed to an engine that includes two containers arranged as a diametrically opposed pair in a vertical alignment having a top container and a bottom container. The top container has a first enclosed volume, and the bottom container has a second enclosed volume. Preferably, the first volume is greater than the second volume. A connecting arm is provided in communication with each container. This connecting arm includes a central hollow bore, and the diametrically opposed pair are in fluid communication through the hollow bore of the connecting arm. A volume of a low boiling point liquid is disposed in the bottom container. A wire coil is wrapped around the connecting arm between the two containers, and a flotation collar containing a permanent magnet is disposed in the hollow bore.

The engine includes an active beat exchanger, e.g., a heat pump, in communication with the bottom container to transfer heat to and to remove heat from the bottom container. In one embodiment, the active heat exchanger include a first active heat exchanger portion in communication with the liquid disposed in the bottom container and a second active heat exchanger portion disposed in the bottom container in a gas space above the liquid. The active heat exchanger also includes at least one additional active heat exchanger portion in communication with the controller portion and arranged to exchange heat with the ambient environment. The active heat exchanger includes a controller portion in communication with the first, second and additional heat exchanger portions. The controller portion includes at least one compressor, at least one valve and control electronics. The controller portion is capable of directing the active heat exchanger to either transfer heat to or to extract heat from the bottom container.

DETAILED DESCRIPTION

Systems and methods in accordance with exemplary embodiments of the present invention incorporate active heat exchangers, for example heat pumps, into engines that use the expansion of low-boiling point liquids in a sealed rotational device to produce useful mechanical work. The active heat exchanger is used to move heat from the ambient environment into the low-boiling point liquids contained within the engine. In an embodiment where the active heat exchanger is a heat pump, the evaporation and condensation of a refrigerant are used to transfer heat into, and if desired out of, the low-boiling point liquids of the engine. The operation of heat pumps generally is known in the art. The heat pump consumes energy, for example electrical energy, to power an electric compressor. However, the heat pump can move or transfer more energy than it consumes. For example, the consumption of one unit of electrical energy by the heat pump results in the transfer of three, four or five units of thermal or heat energy. This transferred heat energy is used by the engine to increase the temperature of the low-boiling point liquid, which is used to produce the desired power output from the engine. This ability to use one unit of energy to transfer three or more units of energy is used to produce a desired electrical or mechanical output and provides an increased operating efficiency in exemplary embodiments of engines in accordance with the present invention.

Figure 1:
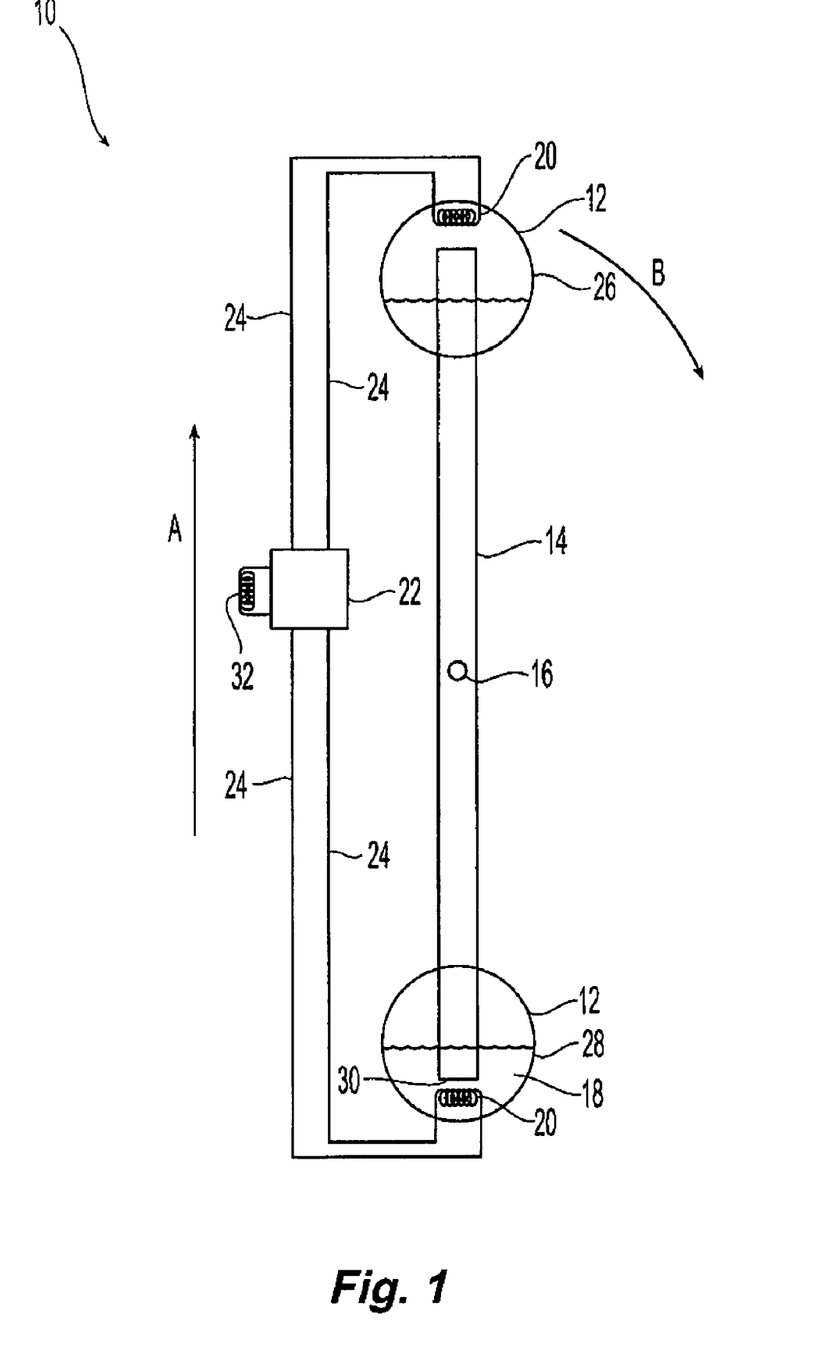
FIG. 1 is a schematic representation of an embodiment of an engine in accordance with the present invention.

Referring initially to FIG. 1, a schematic representation of an exemplary embodiment of an engine 10 in accordance with the present invention is illustrated. The engine includes at least two containers 12 arranged as a diametrically opposed pair. Running between the diametrically opposed pair of containers is at least one connecting arm 14. In addition, a tube is disposed between the two containers to provide a liquid connection between the containers. In one embodiment, the connecting arm and tube are formed as a single structure, i.e. an aim with a hollow central bore. In this embodiment, in addition to providing a fixed connection between the two containers, the connecting arm provides liquid or fluid communication between the containers in the pair. In one embodiment, one connecting tube is attached to each diametrically opposed pair such that each diametrically opposed pair is in fluid communication through the attached connecting tube; however, a plurality of tubes can be associated with any given pair of containers. Suitable materials for the tubes, connecting arms and containers are selected to be compatible with the liquids disposed within the tubes and containers and the pressures to which the tubes and containers are exposed. These materials include, but are not limited to, plastics, polymers, ceramics, metals and combinations thereof.

The containers and connecting tube or connecting arm form a sealed unit, and disposed within this unit is a quantity of a low-boiling point liquid 18. Suitable low boiling point liquids include, but are not limited to chlorofluorocarbons, hydrofluorocarbons, liquid ammonia, propane, carbon dioxide and butane. In general any suitable low boiling point liquid can be used. When the opposed pairs of containers are disposed in a vertical alignment having one container in an uppermost position 26 and one container in a lowermost position 28, a sufficient amount of low-boiling point liquid is disposed in the container in the lowermost position such that the end 30 of the connecting arm 14 and therefore the open end of the connecting tube is disposed below the surface of the fluid.

The engine also includes at least one active heat exchanger. The active heat exchanger includes heat exchange portions 20 disposed within each container. Each heat exchange portion is arranged as a coil, a series of fins or other arrangements to provide increased surface area for heat transfer within each container. In the lowermost container, the heat exchange portion is disposed at least partially within the low-boiling point liquid. In the uppermost container, the heat exchange portion is disposed within the gaseous area above the low-boiling point liquid. Each heat exchange portion is in communication through one or more connecting tubes 24 to a controller portion 22 of the active heat exchanger. The controller portion contains the necessary compressors, valves, including expansion valves, and control electronics to operate the active heat exchanger. The valves, compressors and control electronics can selectively use each heat exchange portion to move heat into or to extract heat from a given container. In one embodiment, a single, self-contained active heat exchanger is provided for each container. In another embodiment, a single control portion is provided for a plurality of opposed pairs of containers, and the single control portion is in communication with each heat exchange portion contained in one of the plurality of containers within the plurality of opposed pairs. In one embodiment, the active heat exchanger includes one or more additional heat exchange coils 32 in communication with the controller portion 22. These additional heat exchange coils are used to exchange heat between one or more of the containers and the ambient atmosphere. For example, two additional heat exchange coils can be provided, one for each of the two containers. Each one of the two additional heat exchange coils facilitates the exchange of heat between one of the containers and the ambient environment. The control electronics within the controller portion are used to configure the compressor and valves to utilize the additional heat exchangers as desired to extract heat from or discharge heat into the ambient atmosphere.

In one embodiment, at least one active heat exchanger is provided in communication with each diametrically opposed pair of containers. The active heat exchanger is capable of transferring heat to or removing heat from the containers in each diametrically opposed pair. Alternatively, a plurality of active heat exchangers is provided such that each active heat exchanger is in communication with just one of the containers. In one embodiment, each paired set of containers has one associated active heat exchanger that includes a pump portion and an exchanger portion in communication with the pump portion through suitable piping and connections. For each paired set, the heat exchanger includes one pump and two exchanger portions. One exchanger portion is positioned in each container. Suitable exchanger portions include, but are not limited to, pipes, coils, radiators and arrangements of copper surfaces having increased surface area.

In operation, the active heat exchanger moves heat from the ambient atmosphere into the lowermost container through the heat exchange portion disposed within that container. In one embodiment, heat is also moved from the uppermost container using the heat exchange portion disposed within that container to either the ambient atmosphere, the lowermost container or both the ambient atmosphere and the lowermost container. Moving heat into the lowermost container introduces heat into the low-boiling point liquid in that container. This increases the vapor pressure above the liquid, moving liquid up through the connecting tube or arm in the direction of arrow A from the lowermost container to the uppermost container. As the uppermost container fills with liquid, its weight increases. Eventually, the weight in the uppermost container is sufficient to urge that container downwards, causing the opposed pair of containers to rotate about a central axis or rotating drive shaft 16 to which the arm is attached in the direction of arrow B. In one embodiment, relatively small amounts of heat are removed form the uppermost container during a given cycle, and a larger amount of heat is transferred into the lowermost container to affect the transfer of the low-boiling point working fluid from the lowermost container to the uppermost container.

In one embodiment, each paired, opposed and interconnected set of containers is one unit. The two containers in each paired set are connected by at least one tube or arm as illustrated in the FIG. 1. In one embodiment, the tube and arm are the same structure. Alternatively, the tube and arm form separate structures, for example an arm with a tube running along the length of the arm. Each tube allows the working fluid to pass between containers, for example, from the lowermost container to the uppermost container. The diameter of a given interconnecting tube is selected in accordance with Bernoulli's Theorem to optimize the flow of the low-boiling point liquid through the tube or connecting arm. In particular, the size of the tube is selected so as to accommodate the volume and flow of liquid there through. This diameter approaches in size that of the width or diameter of one of the containers.

Figure 2:
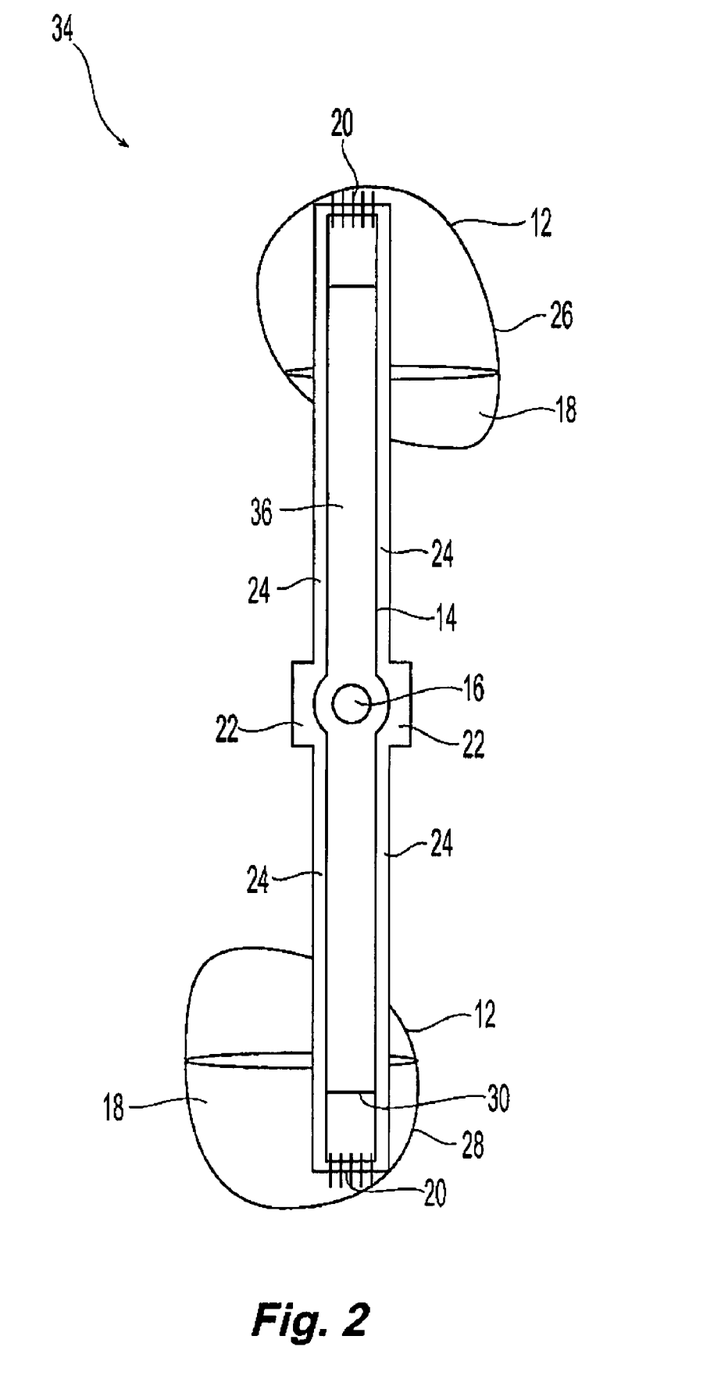
FIG. 2 is a view of another embodiment of the engine in accordance with the present invention.

Referring to FIG. 2, an exemplary embodiment of an engine 34 containing a single pair of containers in accordance with the present invention is illustrated. The containers 12 are illustrated in a vertical arrangement having a lowermost container 28 and an uppermost container 26. The connecting arm 14 between the containers includes a hollow interior 36 that functions as the tube between the containers. Therefore, the connecting arm and the tube are the same structure. The heat exchange portions 20 are disposed in each container, and the connecting tubes 24 run along the sides of the connecting arm 14 to the controller portion 22 of the active heat exchanger. As illustrated, the controller portion 22 is arranged as two separate portions disposed on either side of the middle of the connecting arm adjacent the drive shaft 16. This arrangement of connecting tubes and controller portions is balanced along the connecting arm to eliminate any undue moments about the drive shaft that could adversely affect the rotation of the pair of containers.

Suitable shapes for the containers include cylinders and spheres. However, as illustrated in FIG. 2, for example, each container is not disposed symmetrically about an end of the connecting arm, but is shaped to assist in the rotation of the containers about the central drive shaft. In particular, each container is arranged such that the liquid in the uppermost container is disposed to the side of the connecting arm in the direction of rotation. Therefore, as the liquid fills the uppermost container, the container is urged to fall or rotate in the desired direction. In one embodiment, the container is further shaped so that in the lowermost position, the liquid in the container is disposed substantially evenly about the connecting arm. This minimizes or eliminates moments about the connecting arm that would be induced by the liquid and that could inhibit the rotation of the containers about the central drive shaft. In one embodiment, each container, the connecting arm and connecting tubing are all insulated to prevent undesired heat transfer.

Although any desired size and shape of container can be used, in one embodiment, a plurality of containers are provided wherein each container is less than or equal to about 1 inch wide, and has a working radius of about 1 foot. In another embodiment, each container is about 20 inches wide with a work radius of about 1 foot. Therefore, for a given opposed pair of containers, the containers are spaced about 2 feet apart. In one embodiment, approximately 1 pound of working fluid is provided in each paired unit.

The connecting arm of each opposed pair of containers is connected to the central rotating drive shaft 16. The connecting arm and drive shaft are connected together so that as the arm rotates about the shaft, rotational motion is imparted to the shaft. In one embodiment, this connection is a fixed connection. Alternatively, the connection between the connecting arm and the rotating shaft is a ratcheted connection. For example the rotating shaft includes the gear wheel, and the connecting arm includes the pawl. In another embodiment, the connection between the connecting arm and the rotating shaft allows the uppermost container to rotate in substantially free fall during at least a portion of its rotation from the uppermost position to the lower most position. Therefore, the connecting aim would only engage the rotating shaft while the container passes from about 3 o'clock to about 6 o'clock. The connecting arm would similarly engage the rotating shaft when the second container rotates from the uppermost position to the lowermost position. Any suitable connection between the connecting arm and the rotating shaft can be used, including arrangements where the connecting arm and rotating shaft rotate concentrically. Alternatively, the connecting arm and rotating shaft rotate about separate axes.

Figure 3:
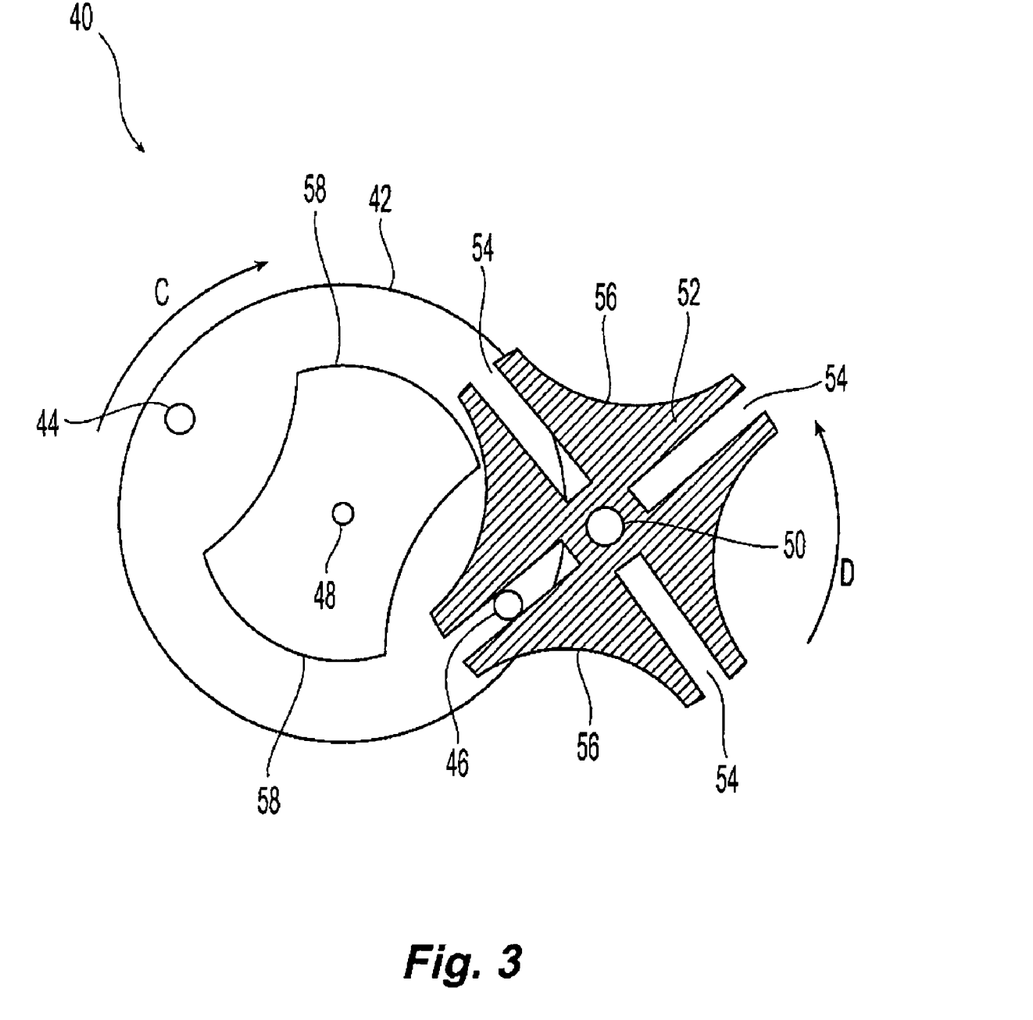
FIG. 3 is a view of an embodiment of a connection mechanism between an arm and a shaft about which the arm rotates.

In order to provide rotational engagement between the arm and the shaft, each arm includes a first part of a two-part rotating connection, and the shaft includes a corresponding second part of the two-part rotating connection in contact with the first part. Referring to FIG. 3, an exemplary embodiment of a two-part connection 40 between the connecting arm and the rotating shaft is illustrated. In accordance with this embodiment, the connecting arm includes or is connected to a first rotating connection part 42 that rotates about a first axis 48. The first rotating connection part includes a first post 44 and a second post 46 extending from the surface. The rotating shaft includes or is connected to a second rotating connection part 52 that rotates about a second axis 50. The first axis 48 is parallel to but spaced from the second axis 50. As the first rotating connection part 42 rotates in the direction of arrow C, the second rotating connection part is not rotating, and one of the first and second posts enters one of a plurality of radial slots 54 disposed in the second rotating connection part. The post travels into the slot and engages one of the sides or bottom of the slot, causing the second rotating connection part to rotate in the direction of arrow D. Since the second rotating connection part is attached to the rotating shaft, rotation of the second rotation connection part rotates the shaft. The second rotating connection part continues to rotate until the slot is positioned such that the post passes out of the slot. The second rotating connection part then stops rotating, and the first rotating connection part can continue to rotate. In one embodiment, the posts are positioned about the first rotating connection so that engagement of the posts in the slots corresponds to movement of the uppermost container from the 3 o'clock position to the 6 o'clock position. The second rotating connection part can include a plurality of concave surfaces 56 that correspond to convex surfaces 58 on the first rotating connection. This arrangement permits relative rotation between a rotating first connection part and a stationary second connection part. The first and second connections can be in direct contact with the connecting arm and rotating shaft or are connected through one or more gear, arms or clutch mechanisms. Permitting free fall during a portion of the rotation provides for the capture of as much energy as possible as the uppermost container moves into the lowermost position under the force of gravity.

In another embodiment, a controllable pneumatic engagement system is used. In this embodiment, a pneumatic or air driven post disposed in the rotating shaft moves outward, for example radially, from the shaft and engages a corresponding hole in the arm. Once engaged, the arm and shaft rotate together. The post would be controlled to engage the arm in the 3 o'clock position and disengage the arm in the 6 o'clock position. Other pneumatic embodiments would use a friction system, for example as found in air brakes, to selectively engage the rotating shaft and the arm.

Figure 4:
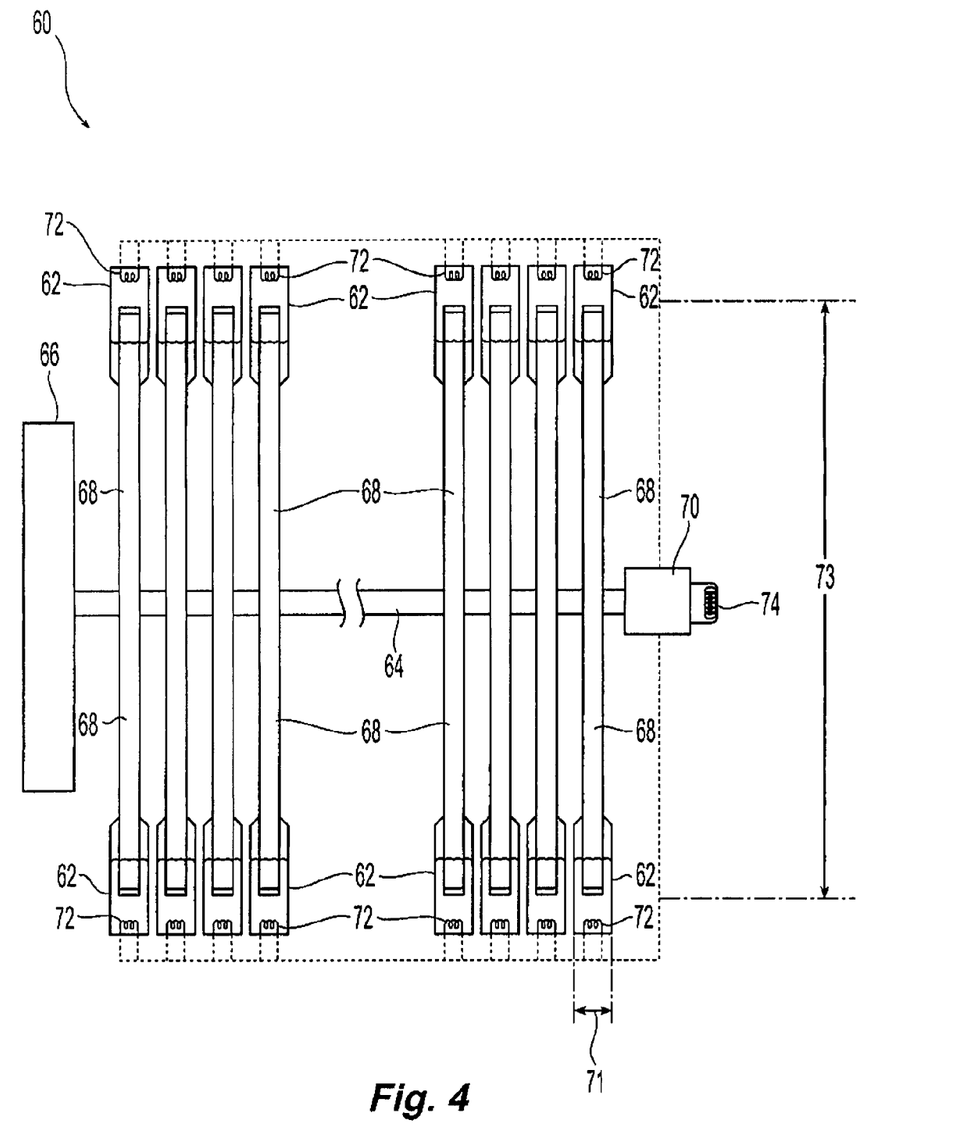
FIG. 4 is a schematic representation of an embodiment of an engine containing an array of paired containers.

In one embodiment, the engine includes a single pair of opposed containers connected to an arm that is connected to the rotating shaft. In other embodiments, two or more opposed pairs of containers are connected to a common rotating shaft. Referring to FIG. 4, an exemplary embodiment of an engine 60 in accordance with the present invention that includes a plurality of containers 62 arranged as a plurality of opposed pairs of containers spaced along the length of a common rotating shaft 64 is illustrated. In one embodiment, the plurality of paired containers forms a circular arrangement of containers that is a coplanar arrangement aligned in a vertical plane and having a central hub around which all the containers in the circle rotate. For a given diametrically opposed pair of containers, each container in that pair oscillates or alternates between an uppermost position and a lowermost position. When in substantially the lowermost position, a given container is in communication with the source of heat from the active heat exchanger, and when in the uppermost position, the container is in communication with the sink of heat from the active heat exchanger.

As illustrated, the common rotatable shaft 64 has a given length, and the plurality of containers associated in pairs is spaced along this length of rotatable shaft. Each pair of containers is in communication with the shaft and can rotate about the shaft in a distinct plane that is substantially perpendicular to the shaft. Preferably, each pair of containers rotates in a separate plane, and all of the planes are substantially parallel to one another. The container pairs are in communication with the shaft such that as the pairs rotate about the shaft, the rotational motion or momentum from the containers is imparted to the shaft as rotational motion. Suitable methods for connecting each pair to the shaft to impart rotational motion are the same as discussed above for the single pair of containers. Preferably, each pair of containers rotates about the shaft independently of the other pairs of containers. Therefore, the different pairs can rotate simultaneously and at different speeds. In one embodiment, the rotating shaft 60 is in communication with a flywheel 66. The shaft imparts rotational movement to the flywheel when the shaft is spinning faster than the flywheel. Suitable arrangements of flywheels are known and available in the art. The flywheel maintains this rotational motion, which is communicated to one or more devices either directly of through an arrangement of gears and transmissions. Alternatively, the rotating shaft is directly connected to a device for harnessing the rotational motion of the shaft. In another embodiment, the engine includes a transmission that is in communication with the shaft and that is capable of modifying at least one of a rotational speed and a torque received from the shaft. These devices convert the rotational motion into the desired electrical work, e.g., producing an electrical current or charging batteries, or mechanical work.

As the pairs are spaced along the shaft, the engine forms an array of paired, rotating containers. The length and size of the array can be varied depending upon the engine application. In one embodiment for a mobile installation as would be used in a moving vehicle, each pair of containers is connected by an arm that has an overall length 73 of about 2 feet, and each container in the pair has a width 71 of about 1 inch measured in a direction parallel to the shaft. A single array or banks of multiple arrays can be used in a given installation. For a moving vehicle, approximately 6 feet wide and 10 feet long, three 10 foot long arrays can be used. In another embodiment, three arrays of 10 pound containers are provided. Again, the containers in a given pair are connected by a 2 foot long arm. In each array, ten pairs are spaced along the axis. Each container has a width 71 of about 20 inches wide measured along the direction of the rotating shaft. These arrays can be combined with flywheels to provide 600 foot pounds of work per unit of time. The work produced can be used directly for vehicle propulsion or for ancillary functions, for example to create hydraulic pressure, to produce hydrogen that would be stored for later use in fuel cells to power the vehicle or to charge an array of batteries.

In one embodiment, each pair of containers in the engine includes the connecting arm 68 attached to both containers in the pair such that each container in the pair is disposed on either end of the arm. Therefore, the engine includes a plurality of arms 68, one each for the plurality of container pairs, and each arm is in rotatable contact with the shaft 64 at a point along the arm 68 between the two containers. In order to impart rotational motion to the shaft, the arm is arranged to engage the shaft as the arm rotates about the shaft. In one embodiment, the arm is fixed to the shaft, and both the arm and the shaft rotate together during an entire rotation. In another embodiment, the arm engages the shaft only during a portion of the rotation. At other points in the rotation, the arm spins free of the shaft. Suitable arrangements for the connection between each arm and the shaft are discussed above. In one embodiment, each arm further includes a first part of a two-part ratchet connection, and the shaft includes corresponding second parts of the two-part ratchet connection, one second part for each arm in communication with the shaft. In one embodiment, the engine also includes a plurality of connecting tubes. Each connecting tube is attached to a given pair of containers such that the containers in the pair are in fluid communication through the attached connecting tube. As illustrated, each connecting arm and connecting tube are formed as a single unit. Each pair of containers and the associated connecting tube contain a volume of the low boiling point liquid. This liquid moves between the containers in that pair through the attached connecting tube when the containers are exposed to a temperature differential.

In order to achieve this heat differential, at least one heat exchange portion 72 is provided in each container. In one embodiment, these heat exchange portions are all in communication with a single, centralized controller portion 70 of the active heat exchanger. The centralized controller portion 70 directs either heated or cooled refrigerant to each heat exchanger as desired to achieve heating and cooling in the containers. The centralized controller portion 70 is also in communication with one or more additional heat exchange coils 74 for exchanging heat with the ambient environment. The active heat exchanger is capable of transferring heat to or removing heat from the containers in each pair of containers. In one embodiment, the active heat exchanger is a heat pump. In one embodiment, each container is associated with its own heat pump, for example, a heat pump of sufficient size to raise or lower the temperature of the container and the liquid or gas within the container by a desired amount within a prescribed period of time. In one embodiment, each pair of containers is associated with its own active heat exchanger.

In one embodiment, each paired set of containers rotates about the central shaft independent of the rotation of the other paired sets. Each paired set of containers engages the rotating central shaft through at least a portion of the rotation, for example as a given container moves from the uppermost position to the lower most position. In one embodiment, each paired set of containers is free to rotate at any time once the uppermost container receives a sufficient amount of the low-boiling point liquid. In another embodiment, the plurality of paired containers is operated as a timed array in a serial, linear fashion. This array is timed in that the timing of the falling of each filled uppermost container is timed or controlled to achieve optimum or maximum energy recapture.

Since each one of the plurality of pairs preferably rotates about the shaft independent of the rotation of the other pairs, in one embodiment, the engine includes a control mechanism (not shown) for synchronizing or timing the rotation of the pairs of containers about the shaft. In particular, the control mechanism prevents or inhibits a container in the uppermost position and having a sufficient amount of liquid from moving or rotating to the lowermost position. Suitable control mechanisms include, but are not limited to, electromagnets mounted on the container or along the length of each connecting arm, mechanical holders that grasp each arm and can be controlled to release the arm and braking systems that are mounted along the shaft for example in the connection between the shaft and each arm. The control mechanism also includes a logic control unit to control the release of each pair of containers in response to one or more predefined conditions such as the expiration of a given period of time or the rotational speed of the shaft or flywheel. Suitable control mechanisms are components known and available in the art.

Therefore, the plurality of container pairs forms a timed array in combination with the shaft. In one embodiment, where the planes in which each pair of containers rotates are substantially vertical, and the containers can oscillate between an uppermost position and a lowermost position, such that when moving from the uppermost position to the lower most position, each container is capable of free falling at least a portion of the distance between the uppermost position and the lowermost position, the control mechanism times when a given container can begin a free fall from its uppermost position to its lowermost position. In one embodiment, sensors are used to determine when a given container in the uppermost position is sufficiently full of liquid. The full container can then be released based upon time or the rotational speed of the rotatable shaft or flywheel. In one embodiment, the logic control unit uses algorithms that use the temperature of the ambient air as a variable for determining how fast the upper container will fill with fluid and that calculate the maximum energy recapture based on the availability of filled containers in the uppermost position and the release intervals of the available containers.

In one embodiment, a plurality of 20 pound containers each having a width of about 20 inches and disposed in pairs having a connecting arm with a length 73 of about 5 feet are disposed along an axel that is about 20 feet long. Each row of paired containers can generate 1000 foot pounds of force. With three parallel rows arranged in five stacks, a total of 15,000 foot pounds are possible. An embodiment of 60 foot long axels arranged in nine axel rows and fifteen rows stacks will produce 405,000 foot pounds of force. In one embodiment, heat is obtained directly from the ambient atmosphere and used to generate electricity and motion without the production of combustion by-products such as $CO_2$ and other pollutants.

In one embodiment, a supplementary source of heat is provided in communication with the active heat exchangers. This supplementary source of heat, for example constructed from an insulated container that holds a quantity of a water soluble polyvalent metal salt in a dehydrated or partially dehydrated stated, is configured to release heat to the active heat exchangers when rehydrated in a controlled fashion by allowing water to hydrate the polyvalent metal salt within the container and, thus, releasing its heat of hydration. In particular, the supplementary heat source is in communication with the additional heat exchange coils of the active heat exchangers. Therefore, the heat produced by the supplementary heat source is transferred into one or more of the containers in the engine. In one embodiment, the supplementary source of heat can also act as a heat sink to accept waste heat transferred out of one or more of the containers of the engine. Suitable supplementary heat sources are described in U.S. Pat. Nos. 4,403,643 and 4,291,755. The entire disclosures of these references are incorporated herein by reference. In general, the polyvalent metal salt or combination of salts within the containers is selected to have a high heat of hydration. These polyvalent metal salts include the halide or sulfate salts of a divalent or trivalent metal and mixtures thereof. Examples of suitable polyvalent metal salts include, but are not limited to, aluminum fluoride, aluminum chloride, beryllium chloride, magnesium chloride, aluminum bromide, aluminum sulfate, ferric chloride, magnesium sulfate, calcium chloride, zinc chloride and combinations thereof.

In one embodiment, the mixture of polyvalent metal salts of the supplementary heat source are provided in a generally dehydrated state. The supplementary heat source can be provided as a portable block or brick, for example held within an insulated container, that can be easily removed or replaced once the heat source is depleted. Any suitable arrangement of the polyvalent metal salts that is suitable to work in conjunction with the heat exchanger portions of the engine can be used. The dehydrated polyvalent metals salts are then exposed to a source of moisture. In one embodiment, the moisture is derived from the relative humidity of the ambient atmosphere, for example by using a fan to circulate air over the material. Alternatively, a source of water is provided to hydrate the polyvalent metal salts. Upon the addition of moisture or water to the polyvalent metal salts to effect hydration, heat is evolved, and this heat is transferred to one or more of the containers in the engine. Since the water used for hydration is reversibly removable, heat directed into one of the above-described containers can be used to remove water from the polyvalent metals salts. Alternatively, a container of these salts can be rehydrated to release heat and then removed from immediate juxtaposition with the heat exchangers and moved to another location, storage area or storage facility, and at some later time, another source of energy, for example the common electrical power grid can be used to dehydrate the salts in the container once again, thus, storing energy for future use through the above described process of adding water or moisture to the now dehydrated water soluble polyvalent metal salt or salts. When water is released from the system by dehydrating the contained salt or salts, the removed water can be recaptured and used, for example, for subsequent hydration or any other function desired. The temperature at which the heat is liberated from the salt is a function of the rate at which the polyvalent metal salts are rehydrated and the rate at which heat is transferred to the containers. The rehydration process is similarly influenced by the temperature and pressure factors that determine dehydration, but in the opposite sense. Thus, the higher the pressure of water vapor, the higher the rate of rehydration and the higher the temperature attainable.

Figure 5:
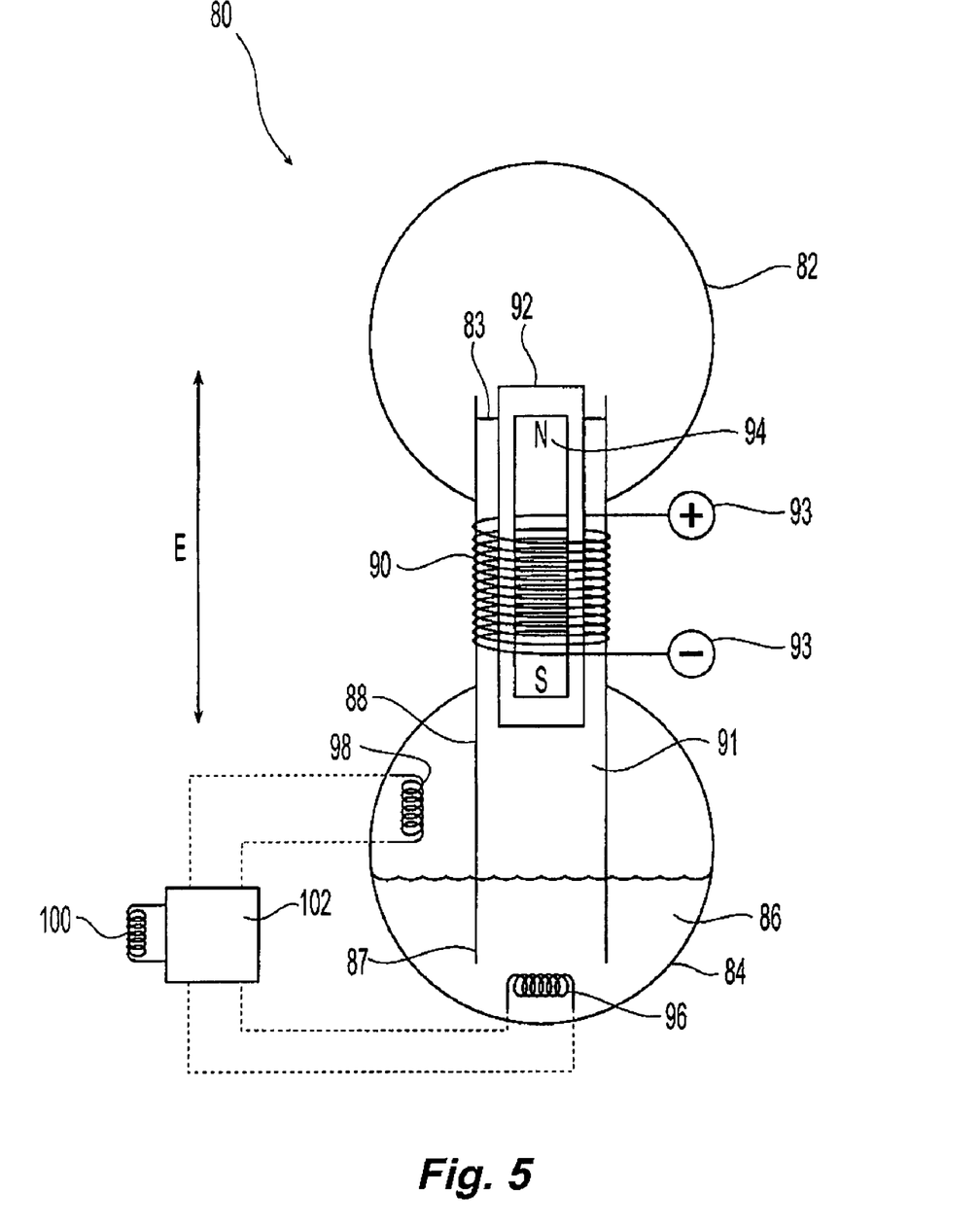
FIG. 5 is a schematic representation of another embodiment of an engine in accordance with the present invention.

Referring to FIG. 5, in one exemplary embodiment of the present invention, the engine is arranged as an electrical generator 80 that produces electrical energy. The generator 80 includes a first container 84 located in a bottom or lowermost position and a second container 82 located in a top or uppermost position. The first and second containers are fixedly secured together and brought into fluid contact through a connecting arm 90 that includes a central tube or hollow bore 91. In one embodiment, the top container is larger in volume than the lower container to minimize compression backpressure. Preferably, the top container has a volume sufficient to permit expansion of the gas phase of the low boiling point liquid in the lower container. Disposed within the first container is a quantity of the low-boiling point liquid 86. A sufficient amount of liquid is disposed in the first container such that the open end 87 of the connecting arm that is disposed in the first container is always located below the surface level of the liquid. Therefore, during all cycles of the engine, the open end of the connecting arm is below the surface of die liquid. Located within the central bore of the connecting arm is a flotation collar 92 encasing a permanent magnet 94. The flotation collar is made of a material that will float in and is compatible with the low-boiling point liquid. In one embodiment, the flotation collar can also include a flexible collar or flange 83 that forms a relatively gas tight or water tight seal between the flotation collar and the sides of the connecting arm. This tight seal, however, is not needed for floating but is used to minimize the distance from the flotation collar to the sides of the connecting arm or tube to minimize friction. A sufficient amount of the flotation collar material is included to float the permanent magnet. In one embodiment, the magnet is round or spherical and hollow, obviating the need for a flotation collar. The poles of the permanent magnet are aligned vertically. A wire coil 90 is wound around the exterior of the connecting arm between the first and second containers. Suitable wire for the wire coil includes copper wire. Electrical leads or connections 93 are disposed on either end of the wire coil. These leads are connected to an electrical load, e.g., a battery or motor, as desired.

A first heat exchanger portion 96 of an active heat exchanger is disposed within the first container in contact with the low-boiling point liquid. A second heat exchanger portion 98 is also disposed in the first container in the space above the liquid. The first and second heat exchanger portions are in contact with a controller portion 102 that contains pumps, valves and electronics to control the operation of the active heat exchanger. One or more additional heat exchanger portions 100 are provided in contact with the controller portion. These additional heat exchanger portions provide for the transfer of heat between the containers and the ambient environment. The operation of the active heat exchanger is the same as the active heat exchangers discussed above, and the active heat exchanger transfers heat into and out of the first container.

The engine 80 utilizes the active heat exchanger to extract heat from the ambient environment. The active heat exchanger, for example a heat pump, consumes one unit of electrical energy to transfer 3, 4 or 5 units of heat energy. The inputted energy in the form of heat is introduced into the first container through at least one of the first and second heat exchanger portions. The introduction of heat energy into the first container increases the vapor pressure above the low-boiling point liquid in the bottom or lowermost container, forcing the liquid up through the connecting tube in the direction of the top or uppermost container, which acts as an expansion chamber. The rising level of liquid in the tube floats or pushes the magnet through the tube and through the wire windings. The first container is then allowed to cool either passively or through the use of at least one of the first and second heat exchanger portions. When then first container is cooled, for example by a few degrees, the vapor pressure above the liquid in the first container will decrease. The level of fluid in the tube will fall down through the connecting arm, and the magnet will also fall back through the tube and the wire windings. This process of heating and cooling is continued, and the magnet oscillates up and down through the tube and wire windings in the direction as indicated by arrow E. The vertical oscillation of a fixed magnet through the wire coil induces a current in the windings that is communicated to the leads and the loads attached to those leads.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. An engine comprising:
   two containers arranged as a diametrically opposed pair;
   at least one connecting tube in communication with each container such that the diametrically opposed pair is in fluid communication through the attached connecting tube;
   a volume of a low boiling point liquid disposed in the diametrically opposed pair of containers and capable of moving between the containers through the connecting tube; and
   at least one active heat exchanger comprising a heat pump in communication with each container and capable of alternately transferring heat to and removing heat from each one of the containers, the active heat exchanger consuming one unit of electrical energy to transfer at least three units of heat energy.

2. The engine of claim 1, further comprising two active heat exchangers, one active heat exchanger in communication with each container.

3. The engine of claim 1, wherein the active heat exchanger comprises a controller portion comprising:
- at least one compressor;
- at least one valve; and
- control electronics;

the controller portion capable of directing the active heat exchanger to either transfer heat to or to extract heat from each one of the containers.

4. The engine of claim 1, wherein the active heat exchanger comprises two heat exchanger portions, one heat exchanger portion disposed in each one of the containers.

5. The engine of claim 4, wherein the active heat exchanger further comprises at least one additional heat exchanger portion arranged to exchange heat with an ambient environment.

6. The engine of claim 1, further comprising:
- a plurality of containers arranged in a plurality of diametrically opposed pairs;
- a plurality of connecting tubes attached to the containers such that each diametrically opposed pair is in fluid communication through at least one of the connecting tubes;
- a volume of a low boiling point liquid disposed in each one of the diametrically opposed pairs.

7. The engine of claim 6, further comprising a plurality of active heat exchangers, at least one active heat exchanger in communication with each one of the diametrically opposed pairs of containers.

8. The engine of claim 7, wherein the plurality of active heat exchangers comprises a plurality of heat pumps.

9. The engine of claim 1, wherein the low boiling point liquid comprises chlorofluorocarbons, hydrofluorocarbons, liquid ammonia, propane, carbon dioxide or butane.

10. The engine of claim 1, further comprising:
- an arm attached to both containers in the pair such that each container in the pair is disposed on either end of the arm; and
- a rotatable shaft in contact with the arm at a point along the arm between the two containers; the arm shaped to engage the shaft to impart rotational motion from the arm to the shaft during at least a portion of each rotation of the arm around the shaft.

11. The engine of claim 1, further comprising a heat source comprising at least one polyvalent metal salt.

12. An engine comprising:
- a rotatable shaft having a given length;
- a plurality of containers associated in a plurality of diametrically opposed pairs, each pair in communication with and rotatable about the shaft in a plane that is substantially perpendicular to the shaft and each pair capable of imparting rotational motion to the shaft, wherein each pair rotates about the shaft independent of the other pairs and the planes in which the pairs rotate are spaced along a length of the shaft;
- a plurality of connecting tubes, each connecting tube attached to a given pair of containers such that the containers in the pair are in fluid communication through the attached connecting tube;
- a volume of a low boiling point liquid disposed in each pair and capable of moving between the containers in that pair through the attached connecting tube when exposed to a temperature differential; and
- at least one active heat exchanger comprising a heat pump in communication with each pair of containers and capable of transferring heat to or removing heat from the containers in each pair of containers, the active heat exchanger consuming one unit of electrical energy to transfer at least three units of heat energy.

13. The engine of claim 12, further comprising a flywheel in communication with the shaft to derive rotational motion therefrom.

14. The engine of claim 12, further comprising a transmission in communication with the shaft and capable of modifying at least one of a rotational speed and a torque received from the shaft.

15. The engine of claim 12, wherein each pair of containers further comprises an arm attached to both containers in the pair such that each container in the pair is disposed on either end of the arm, each arm in rotatable contact with the shaft at a point along the arm between the two containers and shaped to engage the shaft to impart rotational motion from the arm to the shaft as the arm rotates about the shaft.

16. The engine of claim 15, wherein each arm is shaped to engage the shaft during only a portion of the rotation of the arm about the shaft.

17. The engine of claim 12, wherein the planes in which each pair of containers rotates are substantially vertical, and the containers in each pair oscillate between an uppermost position and a lowermost position, such that when moving from the uppermost position to the lower most position, each container is capable of free falling at least a portion of the distance between the uppermost position and the lowermost position.

18. The engine of claim 12, further comprising a control mechanism to control the rotation of the pairs of containers about the shaft.

19. The engine of claim 18, wherein the planes in which each pair of containers rotates are substantially vertical, and the containers can oscillate between an uppermost position and a lowermost position, such that when moving from the uppermost position to the lower most position, each container is capable of free falling at least a portion of the distance between the uppermost position and the lowermost position and the control mechanism times when a given container can begin a free fall from its uppermost position to its lowermost position.

20. An engine comprising:
- two containers arranged as a diametrically opposed pair in a vertical alignment having a top container and a bottom container;
- a connecting arm in communication with each container, the connecting arm comprising a central hollow bore and the diametrically opposed pair in fluid communication through the hollow bore of the connecting arm;
- a volume of a low boiling point liquid disposed in the bottom container;
- a wire coil wrapped around the connecting arm between the two containers;
- a flotation collar disposed in the hollow bore;
- a permanent magnet disposed in the flotation collar; and
- an active heat exchanger comprising a heat pump in communication with the bottom container and capable of transferring heat to and removing heat from the bottom container, the active heat exchanger consuming one unit of electrical energy to transfer at least three units of heat energy.

21. The engine of claim 20, wherein the active heat exchanger comprises a first heat exchanger portion in communication with the liquid disposed in the bottom container and a second active heat exchanger portion disposed in the bottom container in a gas space above the liquid.

22. The engine of claim 20, wherein the active heat exchanger comprises a controller portion in communication with the first and second heat exchanger portions, the controller portion comprising at least one compressor, at least one valve and control electronics, the controller portion capable of directing the active heat exchanger to either transfer heat to or to extract heat from the bottom container.

23. The engine of claim 22, wherein the active heat exchanger further comprises at least one additional heat exchanger portion in communication with the controller portion and arranged to exchange heat with an ambient environment.

24. The engine of claim 20, wherein the low boiling point liquid comprises chlorofluorocarbons, hydrofluorocarbons, liquid ammonia, propane, carbon dioxide or butane.

25. The engine of claim 20, wherein the top container comprises a first volume and the bottom container comprises a second volume, the first volume greater than the second volume.

* * * * *